United States Patent [19]
Shibayama

[11] Patent Number: 5,987,534
[45] Date of Patent: Nov. 16, 1999

[54] RADIO SELECTIVE PAGING RECEIVER PROVIDED WITH AN I/O MEMORY CARD WHICH CAN BE EASILY UPGRADED TO INCLUDE NEW ATTRIBUTES

[75] Inventor: Hiroaki Shibayama, Shizuoka, Japan

[73] Assignee: NEC Corporation, Japan

[21] Appl. No.: 08/935,628

[22] Filed: Sep. 23, 1997

[30] Foreign Application Priority Data

Sep. 25, 1996 [JP] Japan ................................. 8-253505

[51] Int. Cl.⁶ .................................................. G06F 13/14
[52] U.S. Cl. ...................... 710/14; 340/825.83; 345/204
[58] Field of Search .................................. 395/822, 821; 340/825.83; 345/204; 710/2, 14

[56] References Cited

U.S. PATENT DOCUMENTS

| | | | |
|---|---|---|---|
| 5,210,854 | 5/1993 | Beaverton et al. ..................... | 395/500 |
| 5,423,086 | 6/1995 | Cannon et al. ....................... | 455/186.1 |
| 5,426,432 | 6/1995 | Sanemitsu ............................. | 341/173 |
| 5,465,106 | 11/1995 | Keech et al. ........................... | 345/204 |
| 5,761,528 | 6/1998 | Arai ....................................... | 395/822 |

*Primary Examiner*—Thomas C. Lee
*Assistant Examiner*—Abdelmoniem L Elamin
*Attorney, Agent, or Firm*—Ostrolenk, Faber, Gerb & Soffen, LLP

[57] ABSTRACT

A radio selective paging receiver in which data can be shared between PC and the radio selective paging receiver and the system can be easily upgraded. An attribute setting means includes a card attribute and a shared memory space selective register. A self card shared memory space (memory means 1 and memory means 2) is selectively set based on a set value for a shared memory space selective register provided from the terminal. The control setting means executes selective process based on information stored in the register.

10 Claims, 9 Drawing Sheets

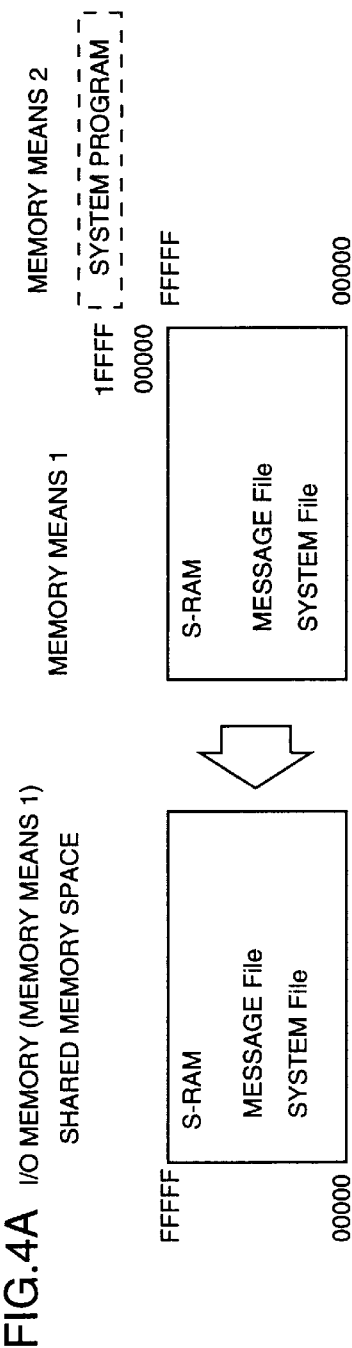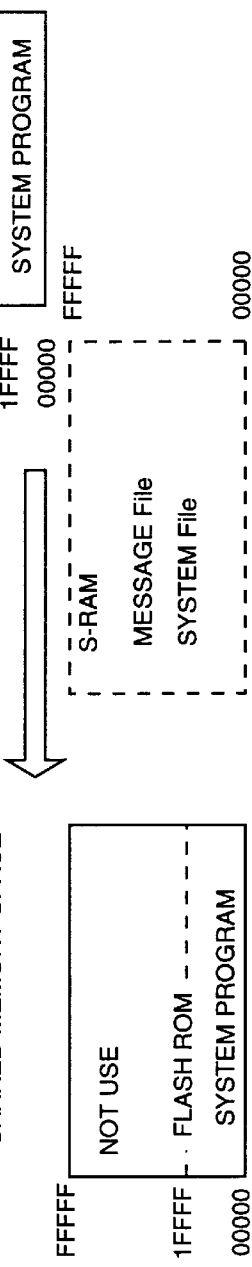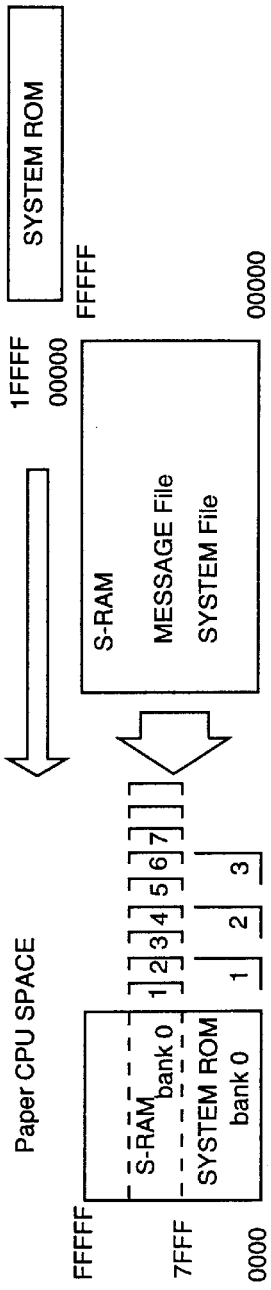

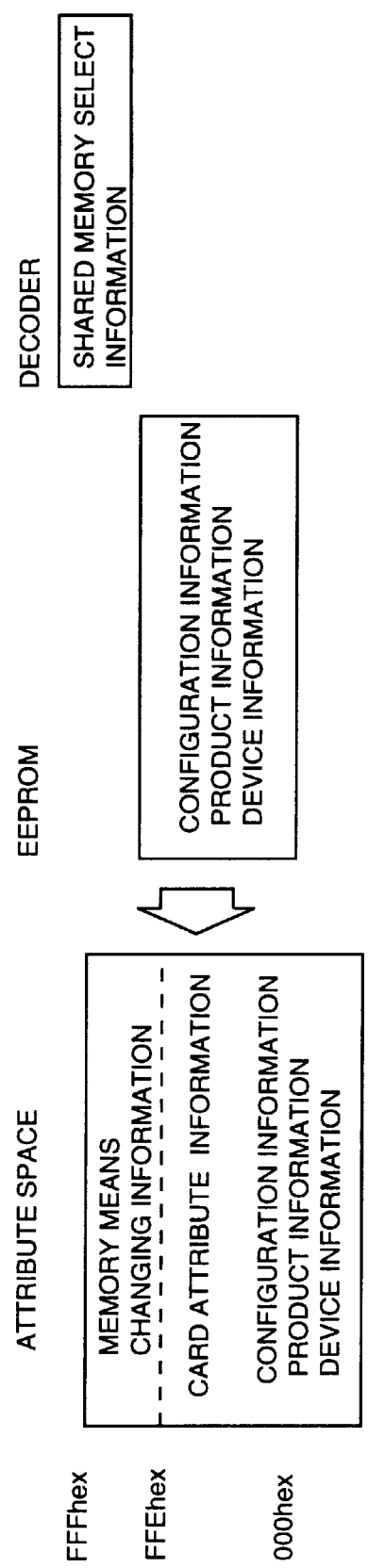

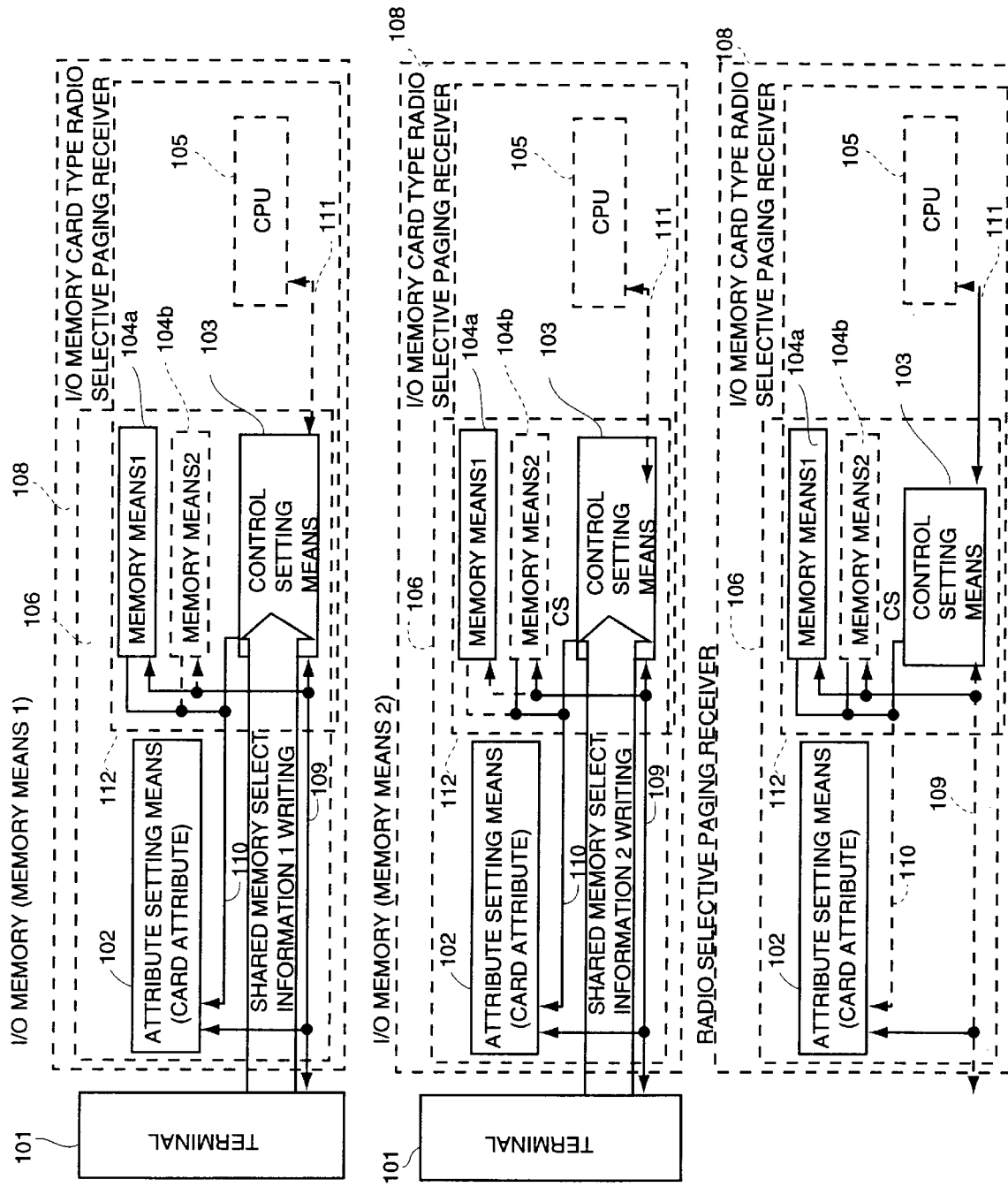

PRIOR ART
FIG. 8
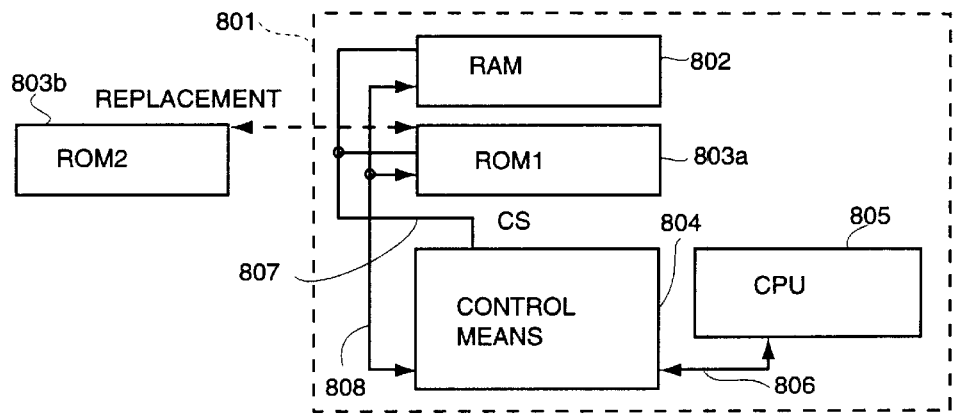
PRIOR ART
FIG. 9 A  NORMAL USEING
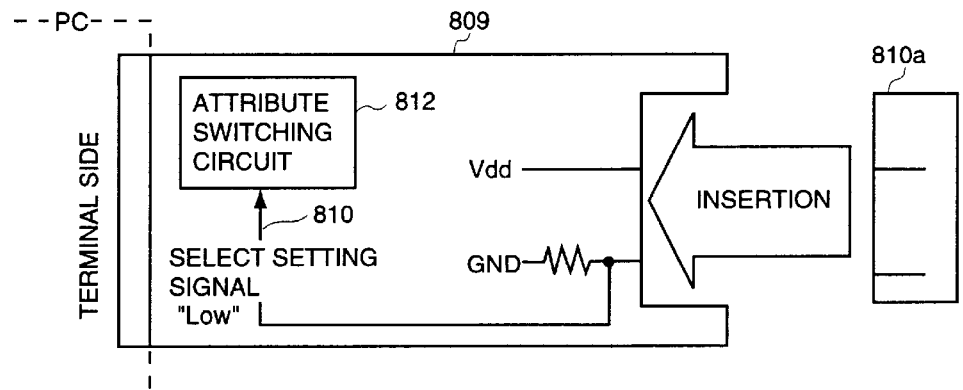
FIG. 9 B  SYSTEM-UPGRADING
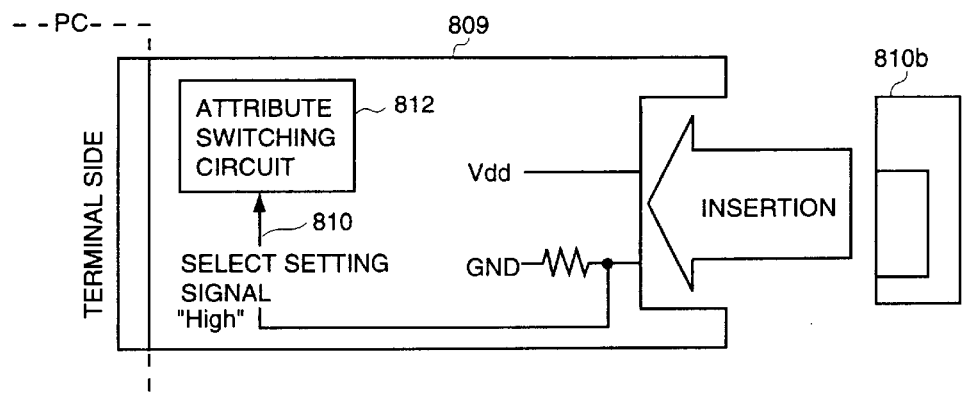

RADIO SELECTIVE PAGING RECEIVER PROVIDED WITH AN I/O MEMORY CARD WHICH CAN BE EASILY UPGRADED TO INCLUDE NEW ATTRIBUTES

BACKGROUND OF THE INVENTION

The present invention relates to an I/O card device (hereinafter, referred to as an I/O memory card) conformed to the JEIDA/PCMCIA (Japan Electronic industry Development Association/Personal Computer Memory Card International Association) standards, and the method for operating the same. Particularly, the present invention relates to an operating method in which the function of the radio selective paging receiver system provided with the I/O memory card can be easily changed and to sharability of data between terminals and a radio selective paging receiver.

In the conventional radio selective paging receiver of that type as disclosed, for example, in JP-A-274710/1994, the function of the I/O memory card can be easily changed by upgrading the version of a communication protocol and improving malfunctions thereof.

FIG. 8 is a block diagram showing an example of a conventional radio selective paging receiver circuit. In this device, the RAM 802 or ROM 1-803a is selected by the chip select (CS) 807 of the control means 804 and then operates the program via the control line 808.

In order to upgrade this system, the ROM1-803a must be replaced by the ROM 2-803b after the housing of the radio selective paging receiver is opened. Hence, upgrading the system requires a lot of trouble.

FIG. 9 is a block diagram showing another example of a conventional radio selective paging receiver. In normal use, the insertion plug 810a, as shown in FIG. 9A, is inserted into the system body 809. In this case, since the select setting signal 810 becomes a "Low" signal, the attribute switching circuit 812 is set to a normal attribute. Thus, the attribute switching circuit 812 is set to the memory card attribute No. 1 shown in FIG. 10.

In a system-upgrade case, when the insertion plug 810b, as shown in FIG. 9B, is inserted into the system body 809, the select setting signal 810 becomes a "High" level. Thus, the attribute switching circuit 812 is set to the memory card attribute No. 2 shown in FIG. 10.

In this case, in order to switch the select setting signal 810, it is needed to prepare two kinds of insertion plugs and to perform a specific electrical operation. Hence, the switching operation cannot be easily changed.

The first problem of the prior art is that the system upgrade requires a specific operation and a specific device to externally switch the attribute, so that easiness and portability are spoiled. The reason is that a specific device and a specific plug must be prepared and a specific operation must be mastered.

The second problem of the prior art is that the ROM inside the case cannot be easily replaced. The reason is that the portability is spoiled regardless of the portable specific body because the plug is externally inserted. Further, the problem is that the I/F forming the radio selective paging receiver function is not prepared to the portable terminal.

SUMMARY OF THE INVENTION

The present invention is made to solve the above-mentioned problems. The objective of the present invention is to provide an I/O memory card conformed to the JEIDA/PCMCIA standards in which the card function can be easily changed to upgrade the system version and to improve the system malfunction thereof.

Another objective of the present invention is to provide a radio slective paging receiver operating method in which the card function can be easily changed to upgrade the system version and to improve the system malfunction thereof.

The objective of the present invention is achieved by an I/O memory-card type radio selective paging receiver comprising plural memory means (shared memory spaces); attribute setting means for setting a self-card attribute; means for storing attribute setting; and control means for controlling plural memory means (shared memory spaces) which can be selectively used according to a value stored by said means for storing attribute setting; a memory card attribute and selective setting attributes of said plural memory means being set to the attribute setting means; attribute values selectively setting said plural memory means supplied from a terminal being stored by the attribute setting storing means; one of the plural memory means (shared memory spaces) being selectively controlled using the attribute value.

According to the present invention, the I/O memory-card type radio selective paging receiver further comprises a register for selectively setting the plural memory means (shared memory spaces) to a specific address of attribute means which stores self card attribute information of the I/O memory-card type radio selective paging receiver, wherein a shared memory space of an I/O memory card is selected by varying a set value of the register.

According to the present invention, in the I/O memory-card type radio selective paging receiver, the plural memory means (shared memory spaces) includes at least a first shared memory space for storing a received message and a second shared memory space for storing a system program of the radio selective paging receiver, and memory data in each of the shared memory spaces is changed using write/read means from the terminal.

According to the present invention, the I/O memory-card type radio selective paging receiver further comprises memory means for storing a received message; and constant format storage means which is shared by said terminal and the radio selective paging receiver; the memory means and the constant format storage means changing the memory data in the first shared memory space which can be written and read from the side of the radio selective paging receiver.

According to the present invention, a method for operating an I/O memory-card type radio selective paging receiver including plural memory means (shared memory spaces), attribute setting means for setting a self-card attribute, means for storing attribute setting, and control means for controlling plural memory means (shared memory spaces) which can be selectively used according to a value stored by the means for storing attribute setting, comprises the steps of setting a memory card attribute and selective setting attributes of plural memory means to the attribute setting means; storing attribute values selectively setting the plural memory means supplied from a terminal by the attribute setting storing means; and selectively controlling one of the plural memory means (shared memory spaces) using the attribute value.

According to the present invention, the method further comprises the steps of selectively setting the plural memory means (shared memory spaces) to a specific address of attribute means which stores self card attribute information of said I/O memory-card type radio selective paging receiver; and selecting a shared memory space of an I/O memory card by varying a set value of the register.

According to the present invention, the method further comprises the steps of preparing at least a first shared memory space for storing a received message and a second shared memory space for storing a system program of the radio selective paging receiver in the plural memory means (shared memory spaces), and changing memory data in each of the shared memory spaces using write/read means from the terminal.

According to the present invention, the method further comprises the steps of preparing memory means for storing a received message; and constant format storage means which is shared by the terminal and the radio selective paging receiver; and changing the memory data in said first shared memory space which can be written and read from the side of the radio selective paging receiver, by means of the memory means and the constant format storage means.

BRIEF DESCRIPTION OF THE DRAWINGS

This and other objects, features and advantages of the present invention will become more apparent upon a reading of the following detailed description and drawings, in which:

FIGS. 4A–4C are explanatory diagrams showing an example of the system block according to the embodiment;

FIG. 5 is an explanatory diagram showing an example of a block for setting a card attribute, according to the embodiment;

FIGS. 6A–6C are explanatory diagrams showing an example of a shared space switching operation according to the embodiment;

FIG. 8 is a block diagram showing a prior art;

FIGS. 9A–9B are block diagrams showing a prior art; and

DESCRIPTION OF THE EMBODIMENTS

Next, an embodiment of the present invention will be described below in detail with reference to the attached drawings.

§1. Principle of the present invention

Figure 1:
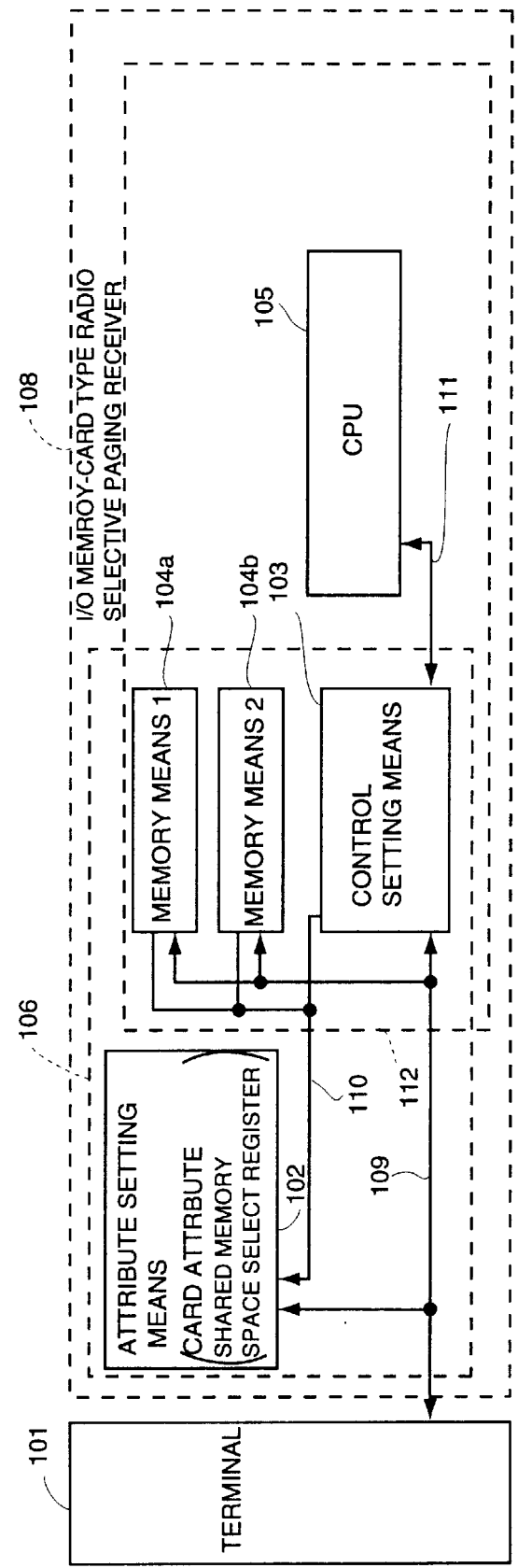
FIG. 1 is a block diagram showing the principle of the present invention.

FIG. 1 is a block diagram showing the principle of the present invention. In FIG. 1, Numeral 101 represents a terminal. Numeral 108 represents an I/O memory-card type radio selective paging receiver. Numeral 102 represents attribute setting means for setting the attribute of the radio selective paging receiver 108. Numeral 103 represents control means for executing procedures based on information written into the attribute setting means 102. Numeral 104a and 104b represent memories. Numeral 105 represents a CPU (Central Processing Unit). Numeral 106 represents an I/O memory card section. Numeral 109 represents a control line which interconnects an I/O memory card section 106, a radio selective paging section 112, and a terminal 101. Numeral 112 represents a radio selective paging receiver section being a combination of the memory means (memory means 104a and memory means 104b) and control setting means 103 and the CPU 105. Numeral 110 represents a select setting signal for setting the attribute of the I/O memory card and the memory means (memory means 104a and memory means 104b).

Referring to FIG. 1, a card attribute and a shared memory space select register are installed in the attribute setting means 102. The shared memory space in a self card (memory means 1 and memory means 2) is selectively set according to a set value for the shared memory space select register input from the terminal 101. The control setting means 103 executes selective processes based on information stored in the register.

FIG. 1, when the radio selective paging receiver 108 is operated as an I/O memory card to read a received message into the side of the terminal 101, the terminal 101 reads information set to the attribute setting means 102 while the I/O memory card recognizes an accessible memory space by the terminal 101. At the same time, the shared memory space select register in the attribute setting means 102 is set to the memory means 2-104b.

Referring to FIG. 1, in order to upgrade the system, the terminal 101 reads out information set in the attribute setting means 102 while the I/O memory card recognizes a memory space accessible by the terminal 101. At the same time, the shared memory space selective register in the attribute setting means 102 is set to the memory means 1-104a.

This operation allows the system stored in the memory means of the memory card to be easily written.

Since the memory means 1 and 2 do not have continuos addresses, the radio selective paging receiver uses a dedicated client driver upon the writing of the memory means 2. Thus, the system is rewritten by writing data being conscious of bank of the memory space in the radio selective paging receiver.

When storing a received message to the memory means 1, this radio selective paging receiver stores the same according to the File store processing method of the disk operating system (hereinafter referred to as DOS) of the terminal 101.

This feature allows the memory means 2 to be shared by the radio selective paging receiver or the terminal 101, so that data can be easily read and written.

§2. Embodiment

The embodiment of the present invention will be described below with reference to the attached drawings.

[1] Explanation of configuration

Figure 2:
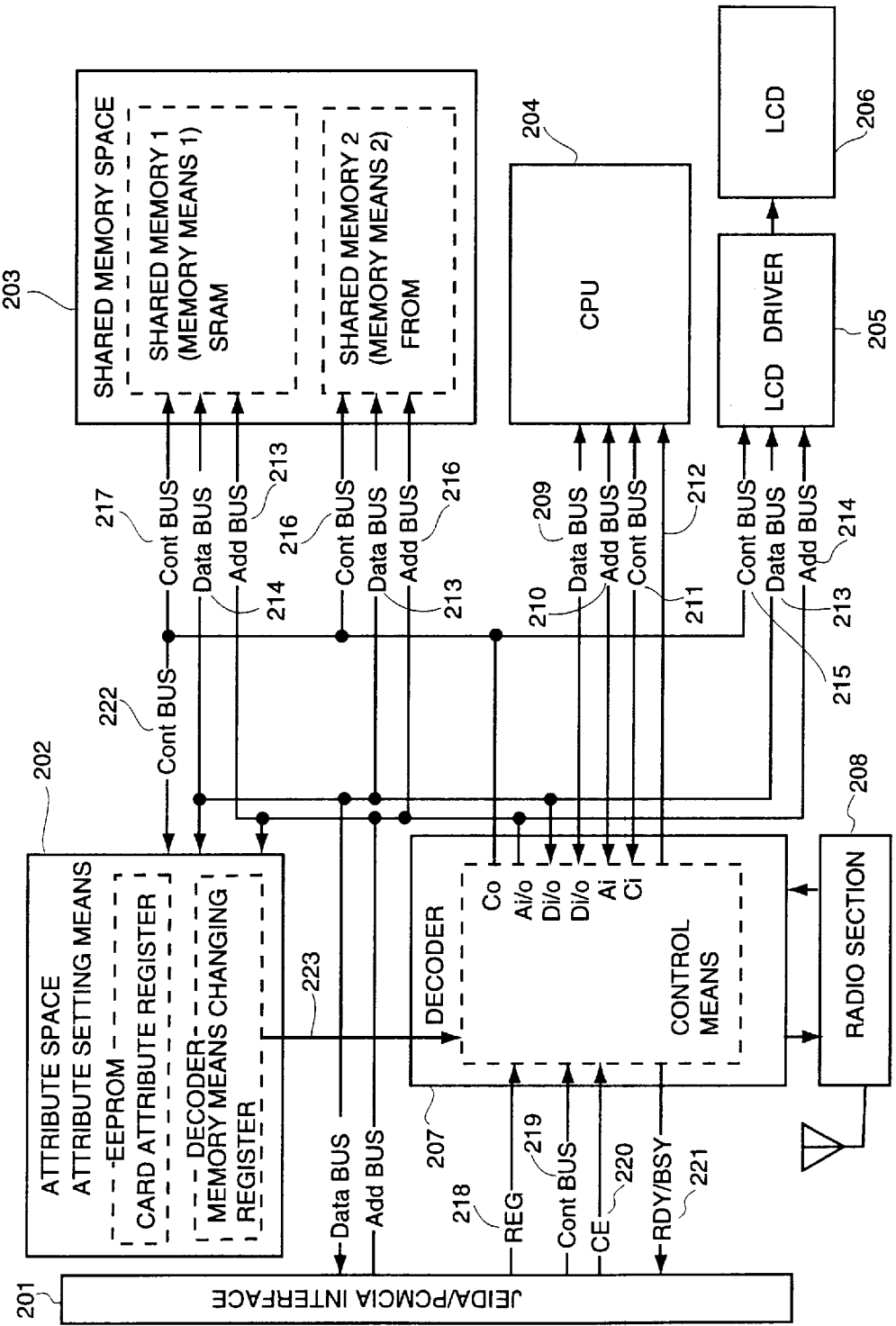
FIG. 2 is a block diagram showing a system configuration according to the embodiment of the present invention.

FIG. 2 is a diagram showing the configuration of the system according to an embodiment of the present invention.

FIG. 2 shows an embodiment in which the radio selective paging receiver and an I/O memory space can be shared.

Referring to FIG. 2, numeral 201 represents a JEIDA/PCMCIA interface (hereinafter referred to as a terminal). Numeral 202 represents an attribute space which includes a card attribute register acting as attribute setting means. As the attribute register, there are an option register, a status register, pin replacement register, a socket copy register, and the like. Here, the detail descriptions are omitted. A memory means changing register is prepared in the attribute space 202.

Numeral 207 represents a decoder. The decoder includes control means that performs processing operations based on a REG signal 218 from the terminal 201, a control signal (READ, WRITE), an address bus 214, a data bus 213, CE (card enable) 220, an address bus 210 extended from the CPU 204, a data bus 209, a control signal 211 (READ, WRITE), and an output 223 from the memory means changing register.

Numeral 204 represents a central processing unit (CPU) used as a radio selective paging receiver. Numeral 203 represents a shared memory space formed of memory means 1 and memory means 2. In the shared memory space 203 according to the present embodiment, the memory means 1 is a SRAM while the memory means 2 is a flash ROM (FROM). Numeral 205 represents an LCD (liquid Crystal) driver used to display received messages. Numeral 206 represents an LCD. Numeral 208 represents a radio section controlled by the CPU 204 via the decoder 207.

Figure 3:
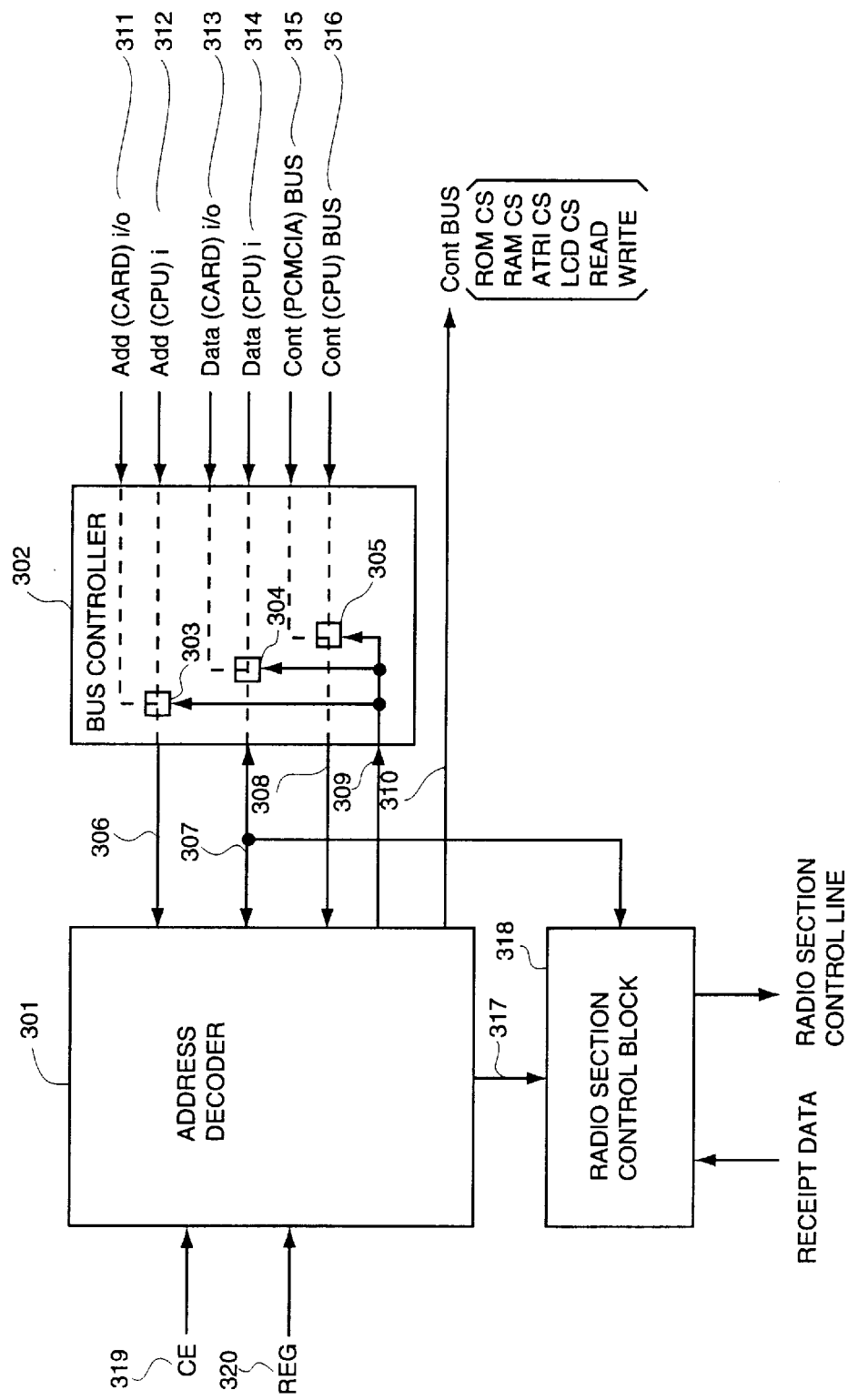
FIG. 3 is a diagram showing the configuration of control means according to the embodiment.

FIG. 3 is a diagram showing the configuration of the control means built in the decoder 207. Referring to FIG. 3, the bus is shared by the CPU 204 and the terminal 201.

The address decoder 301 decodes addresses output from various portions and then outputs the control output 310 and the bus control line signal 309 according to the process thereof.

The bus controller 302 acts as a bus controller that controls the bus when an I/O memory card is used or the radio selective paging receiver is used.

The radio section control block 318 is a block which controls the radio section 208.

Next, the line connection in FIG. 3 will be described. Numeral 311 represents an address bus which connects the decoder 207 with the shared memory space 203 (SRAM and FROM) and connects the attribute space 202 with the LCD driver 205. Numeral 312 represents an address bus which connects the decoder 207 with the CPU 204. Numeral 313 represents a data bus which connects the decoder 207 with the shared memory space 203 (SRAM and FROM) and connects the attribute space 202 with the LCD driver 205. Numeral 314 represents a data bus which connects the decoder 207 with the CPU 204. Numeral 315 represents a control signal (READ, WRITE) which connects the decoder 207 with the terminal 201.

Numeral 316 represents a control signal which connects the decoder 207 with the CPU 204. Numeral 310 represents a control signal for driving respective devices addressdecoded. Numeral 306 represents an internal address bus in the decoder 207. Numeral 307 represents an internal bus in the decoder 207. Numeral 308 represents an internal control bus in the decoder 207. Numeral 317 represents a control line for controlling the radio section control block 318.

[2] Explanation of operation

In the above-mentioned configuration, a card attribute register and a memory means changing register are installed in one attribute block in the attribute space 202. The memory means changing register is set by using a PC side software (hereinafter referred to as a client driver). After the setting operation, the control means inside the decoder 207 selects the shared memory 1 or 2 in the shared memory space 203 according to the set value, based on the information of the output 223 from the memory means changing register. Thus, the client driver can properly use the shared memory space. That is, the client driver can arbitrarily use the I/O memory card selecting the SRAM (shared memory 1), according to the use purpose of a software set up on the PC side. When the FROM (shared memory 2) is selected, the client driver can arbitrarily perform the read/write operation. Hence, the version of the system can be easily upgraded.

Figure 7:
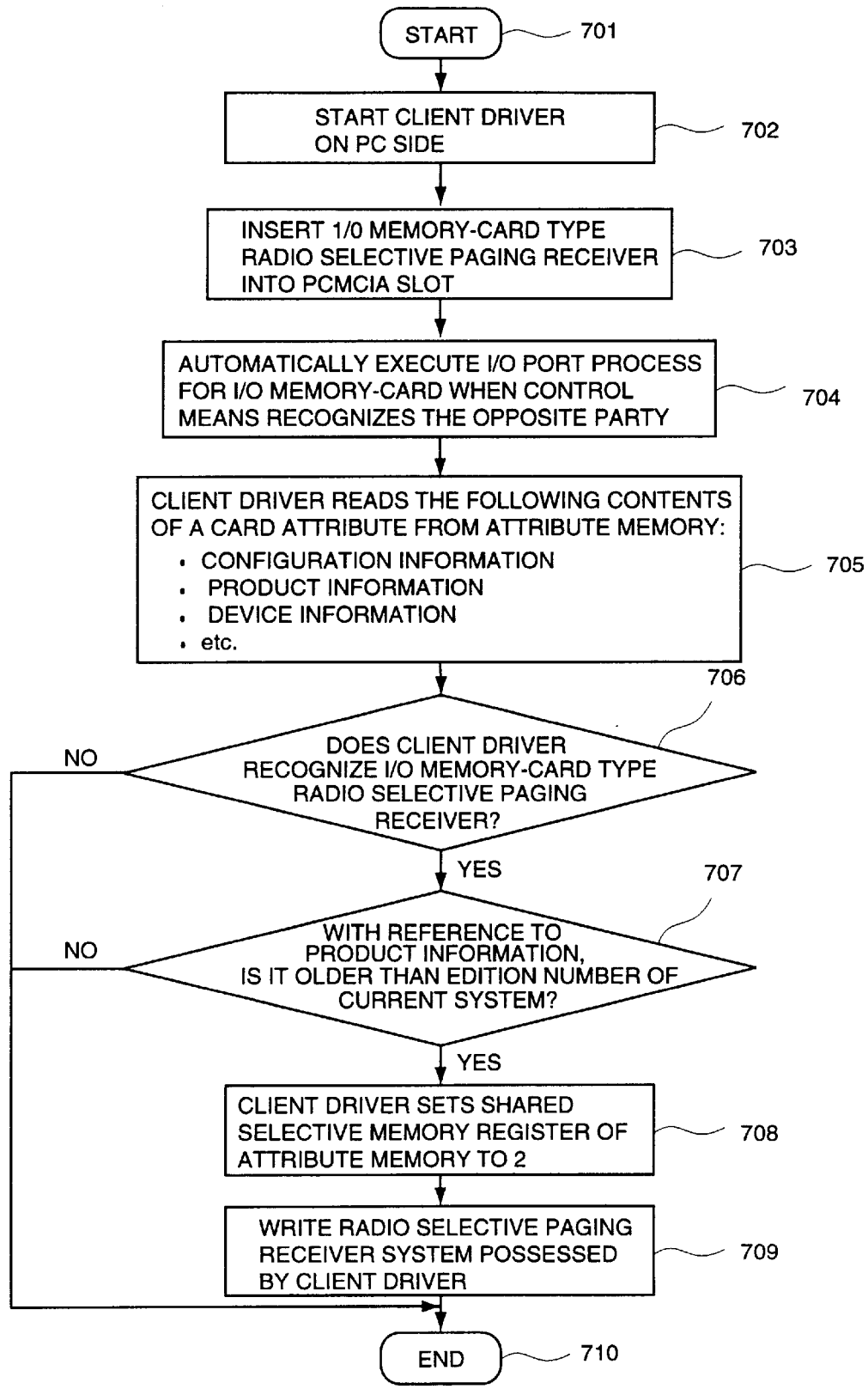
FIG. 7 is a flow chart showing system upgrading process according to the embodiment.
Figure 10:
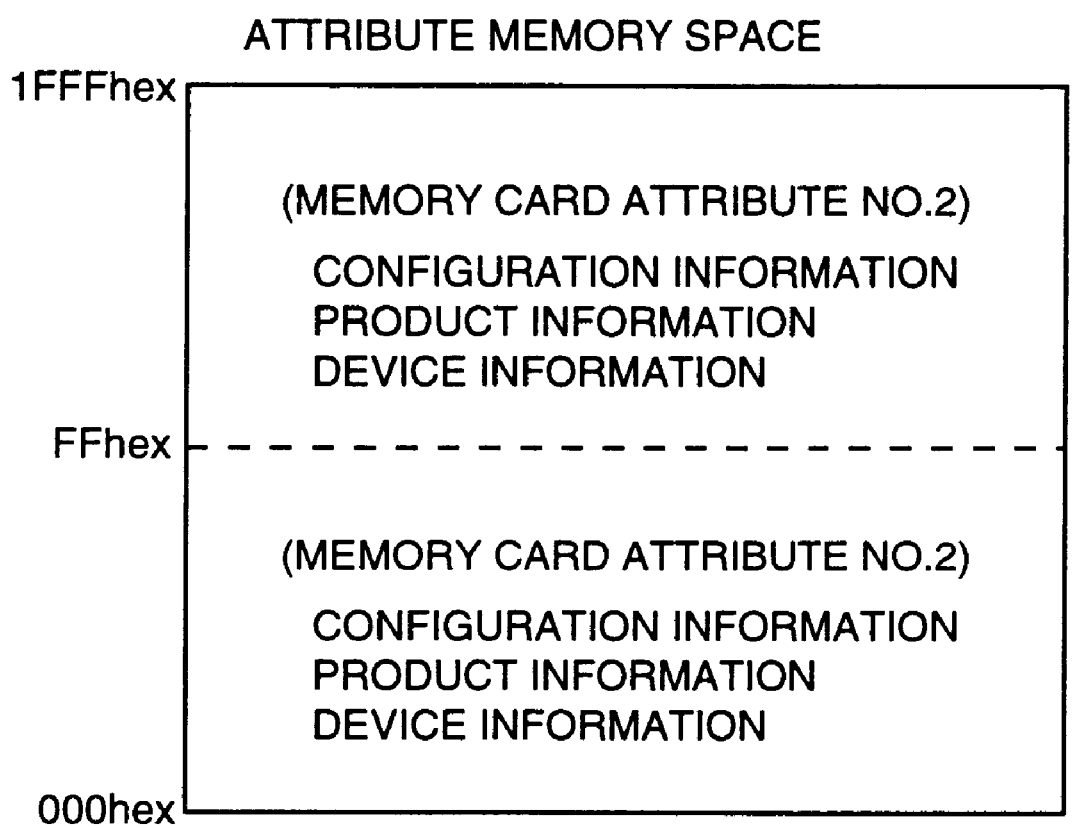
FIG. 10 is an explanatory diagram showing an example of an attribute memory space according to the prior art.

Next, the operation of the present device (operation for upgrading the system) will be described by referring to FIG. 7.

The step 701 represents the beginning of the system.

First, in the step 702, the client driver is activated to recognize the card device on the PC side.

Next, in the step 703, the I/O memory card type radio paging receiver is inserted into the terminal 201.

In the step 704, the control means (refer to FIG. 2) within the decoder 207 executes a port process using the CE 319 and REG 320 such that the bus controller 302 (refer to FIG. 3) validates the address bus 311, the internal address bus in the decoder, the data bus 313, the internal data bus 307 in the decoder, the control line 315, and the decoder control line 308.

After the port process, the client driver reads configuration information of a card attribute register, product information, device information and the like from the attribute space as shown in FIG. 5.

The shared memory space 203 or the attribute space 202 is selected at the REG terminal 320.

In the step 706, the client driver judges whether or not the connected device is an I/O memory card type radio selective paging receiver. If it is recognized that the device is the I/O memory card type selective paging receiver, the version number of the system is recognized in the step 707. If the version number is later than that of the system to be upgraded, the flow goes to the step 710 (end). If it is recognized that the device is not the I/O memory card type radio selective paging receiver in the step 706, the flow goes to the step 710 (end).

Except for the above-mentioned cases, the flow goes to the step 708. If it is recognized in the step 708 that the version number is older than the system version to be upgraded, the client driver sets a value setting the shared memory 2 (FROM) to the memory means changing register in the attribute space 202.

In that operation, the space of the flash ROM (shared memory 2) storing the system program in the shared memory space 203 is selected as shown in FIGS. 6B and 4B. As shown in FIGS. 6A and 4A, the shared memory space 203 is normally set in the SRAM (shared memory 1).

In the step 709, the system program is written into the flash ROM. After the writing operation, the flow goes to the step 710.

Since the program for the radio selective paging receiver, as shown in FIG. 4C, is activated under bank control, the data is written in the step 709 being conscious of bank.

Upon operation of the radio selective paging receiver, the SRAM (shared memory 1) is accessed under bank control as shown in FIG. 4C.

In the present embodiment, data in a file format is saved according to a given format specified by DOS to share data by PC and the radio selective paging receiver. Under bank control, the radio selective paging receiver stores messages in a format defined by DOS. The configuration diagram in such a state is shown in FIG. 6C. In above-mentioned operation, the system can be easily upgraded.

The embodiment according to the present invention has been described with reference to the attached drawings. However, concrete configurations should not be limited only to the embodiments. Modifications in design within the scope of the subject matter of the present invention are included in this invention.

As described above, according to the present invention, the messages of the radio selective paging receiver can be shared with PCs. The reason is that the I/O memory card stores received messages in a data format conformed to the DOS on the PC side.

Moreover, according to the present invention, the system can be easily upgraded merely by distributing the latest client drivers. The reason is that the register installed to switch plural shared memory spaces in an attribute space allows the program memory and message storage section to be simply switched.

What is claimed is:

1. An I/O memory-card type radio selective paging receiver comprising;

plural memory means;

attribute setting means for setting an attribute of the memory-card and providing an attribute setting;

means for storing the attribute setting; and control means for controlling said plural memory means which can be selectively used according to an attribute value stored in said means for storing the attribute setting;

a memory-card attribute and a selected setting attribute of said plural memory means being set to the setting provided by said attribute setting means;

attribute values selectively setting said plural memory means being supplied from a terminal adapted to be coupled to the memory-card and being stored by said means for storing the attribute setting;

one of said plural memory means being selectively controlled using said attribute value, thereby allowing the selected one of the plural memory means to be shared by said terminal and said memory card.

2. The I/O memory-card type radio selective paging receiver of claim 1, further comprising:

a register for selectively setting said plural memory means to a specific address of attribute means which stores memory card attribute information of said I/O memory-card type radio selective paging receiver, wherein a shared memory space of an I/O memory card is selected by varying a set value of said register.

3. The I/O memory-card type radio selective paging receiver of claim 2, wherein said plural memory means include at least a first shared memory space for storing a received message and a second shared memory space for storing a system program of said radio selective paging receiver, and wherein memory data in each of said shared memory spaces is changed using write/read means from said terminal.

4. An I/O memory-card type radio selective paging receiver comprising:

plural memory means;

attribute setting means for setting an attribute of the memory-card and providing an attribute setting;

means for storing the attribute setting; and control means for controlling said plural memory means which can be selectively used according to an attribute value stored in said means for storing the attribute setting;

a memory-card attribute and a selected setting attribute of said plural memory means being set to the setting provided by said attribute setting means;

attribute values selectively setting said plural memory means being supplied from a terminal adapted to be coupled to the memory-card and being stored by said means for storing the attribute setting;

one of said plural memory means being selectively controlled using said attribute value;

a register for selectively setting said plural memory means to a specific address of attribute means which stores memory-card attribute information of said I/O memory-card type radio selective paging receiver, wherein a shared memory space of an I/O memory card is selected by varying a set value of said register;

wherein said plural memory means include at least a first shared memory space for storing a received message and a second shared memory space for storing a system program of said radio selective paging receiver, and wherein memory data in each of said shared memory spaces is changed using write/read means from said terminal; and further comprising:

memory means for storing a received message; and constant format storage means which is shared by said terminal and said radio selective paging receiver; said memory means and said constant format storage means changing said memory data in said first shared memory space which can be written and read from said radio selective paging receiver.

5. A method for operating an I/O memory-card type radio selective paging receiver including plural memory means, attribute setting means for setting an attribute of the memory-card and providing an attribute setting, means for storing the attribute setting, and control means for controlling the plural memory means which can be selectively used according to an attribute value stored by said means for storing the attribute setting, the method comprising the steps of:

setting a memory-card attribute and a selected setting attribute of the plural memory means to said setting provided by said attribute setting means;

storing attribute values selectively setting the plural memory means supplied from a terminal adapted to be coupled to the memory-card in said means for storing an attribute setting; and selectively controlling one of said plural memory means using said attribute value, thereby allowing the selected one of the plural memory means to be shared by said terminal and said memory card.

6. The method of claim 5, further comprising the steps of:

selectively setting said plural memory means to a specific address of attribute means which stores memory-card attribute information of said I/O memory-card type radio selective paging receiver; and selecting a shared memory space of an I/O memory card by varying a set value of said register.

7. The method of claim 6, further comprising the steps of:

preparing at least a first shared memory space for storing a received message and a second shared memory space for storing a system program of said radio selective paging receiver in said plural memory means, and changing memory data in each of said shared memory spaces using write/read means from said terminal.

8. A method for operating an I/O memory-card type radio selective paging receiver including plural memory means, attribute setting means for setting an attribute of the memory-card and providing an attribute setting, means for storing the attribute setting, and control means for controlling the plural memory means which can be selectively used according to an attribute value stored by said means for storing an attribute setting, the method comprising the steps of:

setting a memory-card attribute and a selected setting attribute of the plural memory means to said setting provided by said attribute setting means;

storing attribute values selectively setting the plural memory means supplied from a terminal adapted to be coupled to the memory-card in said means for storing an attribute setting; and selectively controlling one of said plural memory means using said attribute value selectively setting said plural memory means to a specific address of attribute means which stores memory card attribute information of said I/O memory-card type radio selective paging receiver; and selecting a shared memory space of an I/O memory card by varying a set value of a register;

preparing at least a first shared memory space for storing a received message and a second shared memory space for storing a system program of said radio selective paging receiver in said plural memory means, and changing memory data in each of said shared memory spaces using write/read means from said terminal;

further comprising the steps of:

preparing memory means for storing a received message; and providing constant format storage means which is shared by said terminal and said radio selective paging receiver; and changing said memory data in said first shared memory space which can be written and read from said radio selective paging receiver, by means of said memory means and said constant format storage means.

9. The I/O memory-card type radio selective paging receiver of claim 1, wherein the plural memory means comprise shared memory spaces.

10. The method of claim 5, wherein the plural memory means comprises shared memory spaces.

* * * * *